United States Patent [19]

Tzeng

[11] Patent Number: 4,718,120
[45] Date of Patent: Jan. 5, 1988

[54] POLARIZATION INSENSITIVE COHERENT LIGHTWAVE DETECTOR

[75] Inventor: Liang Tzeng, Fogelsville, Pa.

[73] Assignee: American Telephone and Telegraph Company, AT&T Bell Laboratories, Murray Hill, N.J.

[21] Appl. No.: 933,827

[22] Filed: Nov. 24, 1986

[51] Int. Cl.[4] .............................................. H04B 9/00
[52] U.S. Cl. ..................................... 455/619; 455/616
[58] Field of Search ............... 455/606, 607, 612, 616, 455/619; 370/2

[56] References Cited

U.S. PATENT DOCUMENTS 3,214,590 10/1965 Schachtman ........................ 455/616
3,971,930 7/1976 Fitzmaurice et al. ................ 455/608
4,506,388 3/1985 Monerie et al. ...................... 455/616

OTHER PUBLICATIONS

"Demodulation of Optical DPSK . . . ", Electronics Letters, vol. 21, No. 19, Sep. 1985, T. Hodgkinson, pp. 867-868.

Primary Examiner—Robert L. Griffin
Assistant Examiner—Leslie Van Beek
Attorney, Agent, or Firm—Wendy W. Koba

[57] ABSTRACT

A coherent lightwave demodulator is disclosed which is insensitive to the polarization state of the incoming message signal. The demodulator includes a pair of optical hybrids (aligned to the polarization state of the local oscillator) and a pair of optical balanced receivers. A squaring arrangement, for example a delay demodulator, responsive to the output from the pair of optical balanced receivers eliminates the polarization-dependent component of the message signal and allows the recovery of the message signal regardless of the polarization state of the incoming message signal.

5 Claims, 1 Drawing Figure

POLARIZATION INSENSITIVE COHERENT LIGHTWAVE DETECTOR

BACKGROUND OF THE INVENTION

1. Field of the Invention

The present invention relates to a polarization insensitive coherent lightwave detector and, more particularly, to a coherent lightwave detection system where only the polarization state of the local oscillator must be known to recover information from the transmitted optical signal. The polarization state of the transmitted signal is irrelevant to achieving recovery.

2. Description of the Prior Art

Coherent lightwave detection systems are becoming increasingly prevalent in many lightwave communication arrangements. In many such systems, conventional heterodyne/homodyne techniques are used to recover the transmitted signal. These techniques require that the polarization state of the local oscillator be accurately aligned to the polarization state of the message signal to assure accurate recovery of the message. This limitation is considered to be a serious drawback to the advance of coherent lightwave detectors. One prior art arrangement which addresses this polarization problem is described in the article entitled "Demodulation of Optical DPSK Using In-Phase and Quadrature Detection" by T. G. Hodgkinson et al. appearing in *Electronic Letters*, Vol. 21, No. 19, September 1985, at pp. 867-77, In this arrangement, a 90° optical hybrid is used to achieve the in-phase and quadrature detection, where the local oscillator is connector to a first input of the hybrid via a first polarization controlling member and the transmitted DPSK signal is connected to the remaining input of the hybrid via a second polarization controlling member. However, since the polarization state of both signals are subject to drift, the polarization controllers must be monitored to insure correct operation of the demodulator.

An alternative coherent detection system, described in U.S. Pat. No. 4,506,388 issued to M. Monerie et al on Mar. 19, 1985, although capable of being used with a message signal of random polarization, still requires that the polarization state of the local oscillator match that of the message signal.

A need remains in the prior art, therefore, for a coherent detection system which is truly independent of the polarization state of the transmitted message signal.

SUMMARY OF THE INVENTION

The need remaining in the prior art is addressed by the present invention which relates to a polarization insensitive coherent lightwave detection systems and, more particularly, to a coherent lightwave detection system where only the polarization of the local oscillator must be known to recover information from the transmitted optical signal. The polarization state of the transmitted signal is irrelevant to achieving recovery.

It is an aspect of the present invention to perform a "squaring operation" in order to remove the message signal's polarization state from the final recovered data signal, where delay demodulators may be used to perform this squaring operation.

Another aspect of the present invention is to utilize a balanced design including a pair of optical hybrids and a pair of balanced detectors to maintain the advantages of prior art balanced arrangements, including common-mode rejection and maximization of optical signal power.

Other and further aspects of the present invention will become apparent during the course of the following discussion and by reference to the accompanying drawing.

BRIEF DESCRIPTION OF THE DRAWING

The sole FIGURE illustrates a double balanced DPSK coherent detection system according to the present invention which is insensitive to the polarization state of the DPSK message signal.

DETAILED DESCRIPTION

Figure 1:
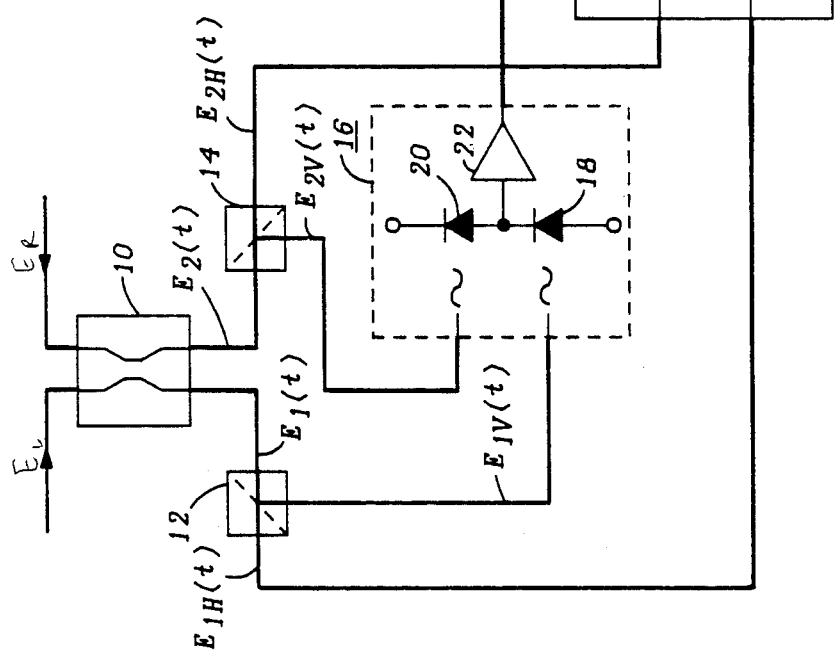

A coherent lightwave detection system which is insensitive to, or independent of, the polarization state of the received message signal is illustrated in the FIGURE. Referring to the FIGURE, received message signal $E_R$ and local oscillator $E_L$ are first applied as separate inputs to a 3 dB optical coupler 10. Received signal $E_R$ is presumed to be a DPSK signal for the purpose of the present discussion, and can be expressed as $$E_R = M(t) \sqrt{2P_R} \cos[\omega_R t + \theta_R(t)], \quad (1)$$

where $M(t)$ represents the DPSK modulation signal, $\omega_R$ is the carrier frequency, and $\theta_R(t)$ is the phase noise associated with the carrier. Similarly, local oscillator signal $E_L$ can be expressed as $$E_L = \sqrt{2P_L} \cos[\omega_L t + \theta_L(t)], \quad (2)$$

where $\omega_L$ is the carrier frequency and $\theta_L(t)$ is the phase noise associated with the carrier. Since the polarization state of the local oscillator is known, coupler 10 may be designed to evenly split the power, $P_L$, of the local oscillator. Therefore, the polarization states of the two signals can be represented as $$P_L = \tfrac{1}{2} P_L \hat{H} + \tfrac{1}{2} P_L \hat{V}, \quad (3)$$

and $$P_R = \beta^2 P_R \hat{H} + (1-\beta^2) P_R \hat{V}. \quad (4)$$

Therefore, the output signals $E_1(t)$ and $E_2(t)$ from 3 dB coupler 10 can be expressed as $$E_1(t) = \sqrt{P_L} \cos[\omega_L t + \theta_L(t) + \Phi_t] + \quad (5)$$

$$M(t) \sqrt{P_R} \cos[\omega_R t + \theta_R(t) + \Phi_r],$$

and $$E_2(t) = \sqrt{P_L} \cos[\omega_L t + \theta_L(t) + \Phi_r] + \quad (6)$$

$$M(t) \sqrt{P_R} \cos[\omega_R(t) + \theta_R(t) + \Phi_t]$$

where $\Phi_t$ and $\Phi_r$ are the phase shift components introduced by coupler 10 due to the nature of the 3 dB coupler and conservation of energy, $\Phi_t - \Phi_r = \pi/2$.

Output signals $E_1(t)$ and $E_2(t)$ subsequently travel along a separate pair of signal paths, where $E_1(t)$ is applied as an input to a first 90° hybrid component 12 and $E_2(t)$ is applied as an input to a second 90° hybrid component 14. Hybrids 12 and 14 can also be considered as polarization-selective beam splitters which will split the input signal into "horizontal" and "vertical" components. Therefore, in accordance with equations (3)–(6), the four outputs from hybrids 12 and 14 will be:

$$E_{1V}(t) = \sqrt{P_L}/2\cos[\omega_L t + \theta_L(t) + \Phi_t + \delta_{1V}] + M(t)\sqrt{1-\beta^2} \sqrt{P_R} \cos[\omega_R t + \theta_R(t) + \Phi_r + \delta_{2V}], \quad (8)$$

$$E_{2V}(t) = \sqrt{P_L}/2\cos[\omega_L t + \theta_L(t) + \Phi_r + \delta_{2V}] + M(t)\sqrt{1-\beta^2} \sqrt{P_R} \cos[\omega_R t + \theta_R(t) + \Phi_t + \delta_{2V}], \quad (9)$$

$$E_{1H}(t) = \sqrt{P_L}/2\cos[\omega_L t + \theta_L(t) + \Phi_t + \delta_{1H}] + M(t)\beta \sqrt{P_R} \cos[\omega_R t + \theta_R(t) + \Phi_r + \delta_{1H}], \quad (10)$$

and $$E_{2H}(t) = \sqrt{P_L}/2\cos[\omega_L t + \theta_L(t) + \Phi_r + \delta_{2H}] + M(t)\beta \sqrt{P_R} \cos[\omega_R t + \theta_R(t) + \Phi_t + \delta_{2H}] \quad (11)$$

where $\delta$ is defined as the phase shift introduced by hybrid components 12 and 14.

The "vertical" outputs $E_{1V}(t)$ and $E_{2V}(t)$ are subsequently applied as a pair of inputs to a first balanced receiver 16. In particular, for the arrangement shown in the FIGURE, balanced receiver 16 comprises a pair of photodiodes 18 and 20, each photodiode responsive to a separate one of the signals $E_{1V}(t)$ and $E_{2V}(t)$. For example, photodiode 18 is responsive to signal $E_{1V}(t)$ and photodiode 20 is responsive to signal $E_{2V}(t)$. Thus, the lightwave signal is transformed into a current, where the pair of currents are applied as an input to an amplifying component 22. In a similar fashion, the horizontal components $E_{1H}(t)$ and $E_{2H}(t)$ are applied as separate inputs to a second balanced receiver 24. The photocurrent outputs from receivers 20 and 24 can be expressed as $$i_v(t) = C[E_{2V}^2(t) - E_{1V}^2(t)], \quad (12)$$

and $$i_h(t) = C[E_{1H}^2(t) - E_{2H}^2(t)], \quad (13)$$

where C is the known constant $\eta e/\hbar\omega$. Referring to equations (8) and (9), it can be shown that $$E_{1H}^2(t) = P_L/4 + \beta^2 P_R/2 + M(t)\beta \sqrt{P_L P_R/2} \cos[\omega_{IF} t + \Phi(t)], \quad (14)$$

and where $$E_{2H}^2(t) = P_L/4 + \beta^2 P_R/2 + \quad (15)$$

-continued $$M(t)\beta \sqrt{P_L P_R/2} \cos[\omega_{IF} t + \Phi(t) - \pi]$$

where $\Phi(t) = \theta_L(t) + \theta_R(t) + \Phi_t - \Phi_r = \theta_L(t) - \theta_R(t) + \pi/2$. The term $\omega_{IF}$ is defined as $\omega_R - \omega_L$, since the difference between the two optical frequencies will result in a frequency in the IF region. Subtracting $E_{2H}^2(t)$ from $E_{1H}^2(t)$ to solve for $i_h(t)$, the DC components will cancel out, and $$i_h(t) = 2CM(t)\beta \sqrt{P_L P_R/2} \cos[\omega_{IF} t + \Phi(t)] \quad (16)$$

In a similar manner it can be shown that $$i_v(t) = 2CM(t)\sqrt{1-\beta^2} \sqrt{P_L P_R/2} \cos[\omega_{IF} t + \Phi(t)] \quad (17)$$

At this point, both $i_h(t)$ and $i_v(t)$ still include $\beta$ terms and as such are considered as polarization dependent. This polarization dependence is removed in accordance with the present invention by a squaring operation, in this case represented as a delay demodulator 30. In operation, output photocurrent $i_v(t)$ from balanced receiver 16 is applied to a first delay component 32 of demodulator 30, where component 32 forms a version of $i_v(t)$ which is delayed by a predetermined time interval T and multiplies $i_v(t)$ by $i_v(t-T)$, where this multiplicative product is denoted $D_v(t)$. For this case, $D_v(t)$ can be expressed as $$D_v(t) = i_v(t) \times i_v(t-T) = C^2 \quad (18)$$
$$M(t)M(t-T)(1-\beta^2)P_L P_S \cos[\Delta\Phi],$$

where $\Delta\Phi = \Phi(t) - \Phi(t-T)$. Similarly, output photocurrent $i_h(t)$ is applied to a second delay component 34 to form a second delayed signal $D_h(t)$, where $D_h(t)$ can be expressed as $$D_h(t) = i_h(t) \times i_h(t-T) = C^2 \quad (19)$$
$$M(t)M(t-T)\beta^2 P_L P_S \cos[\Delta\Phi].$$

The final recovered data signal D(t) can therefore be obtained by adding together the components $D_v(t)$ and $D_h(t)$, as illustrated by the summing unit 36. In accordance with equations (18) and (19), therefore, D(t) can be expressed as $$D(t) = D_h(t) + D_v(t) \quad (20)$$
$$= C^2 M(t)M(t-T)P_L P_S \cos[\Delta\Phi]$$

which in accordance with the teachings of the present invention is independent of the polarization parameter $\beta$ of received message signal $E_R(t)$.

What is claimed is:

1. A coherent lightwave demodulator which is capable of recovering a message signal from a received lightwave signal ($E_R(t)$) without determining the polarization state $\beta$ of said received lightwave signal, said demodulator comprising coupling means responsive to both said transmitted lightwave signal and a locally generated lightwave oscillating signal of a known polarization state ($E_L(t)$), said coupling means generating as separate outputs a first signal ($E_1(t)$) and a second signal ($E_2(t)$) comprising portions of both said transmitted message signal and said locally generated lightwave oscillating signal;

a first polarization-selective beam splitter aligned with said known polarization state of said local oscillating signal for receiving as an input the first signal generated by said coupling means, said first beam splitter for evenly dividing the power of said locally generated lightwave oscillating signal and providing as separate outputs a first horizontally polarized lightwave signal ($E_{1H}(t)$) and a first vertically polarized lightwave signal ($E_{1V}(t)$);

a second polarization-selective beam splitter aligned with said known polarization state of said local oscillating signal for receiving as an input the second signal generated by said coupling means, said second beam splitter for evenly dividing the power of said locally generated lightwave oscillating signal and providing as separate outputs a second horizontally polarized lightwave signal ($E_{2H}(t)$) and a second vertically polarized lightwave signal ($E_{2V}(t)$);

a first balanced optical receiver responsive to said first and said second vertically polarized lightwave signals for providing as an output a first photocurrent ($i_v(t)$) related to the difference between said first and said second vertically polarized lightwave signals; a second balanced optical receiver responsive to said first and second second horizontally polarized lightwave signals for providing as an output a second photocurrent ($i_h(t)$) related to the difference between said first and second second vertically polarized lightwave signals;

first squaring means responsive to said first photocurrent output from said first balanced receiver for generating a squared representation ($D_v(t)$) of said first photocurrent;

second squaring means responsive to said second photocurrent output from said second balanced receiver for generating a squared representation ($D_h(t)$) of said second photocurrent; and summing means responsive to both said first and said second squaring means for adding together said squared representations of said first and said second photocurrents to provide as an output the recovered message signal ($D(t)$).

2. A coherent lightwave demodulator as defined in claim 1 wherein the first polarization-selective beam splitter comprises a first 90° optical hybrid aligned with the known polarization state of the locally generated lightwave oscillating signal; and the second polarization-selective beam splitter comprises a second 90° optical hybrid aligned with said known polarization state of said locally generated lightwave oscillating signal.

3. A coherent lightwave demodulator as defined in claim 1 wherein the first squaring means comprises a first delay demodulator and the second squaring means comprises a second delay demodulator.

4. A coherent lightwave demodulator as defined in claim 3 wherein the first delay demodulator comprises a first delay line responsive to the first photocurrent to form a first delayed photocurrent ($i_v(t-T)$) and a first multiplier responsive to both said first photocurrent and said first delayed photocurrent, the product being the squared representative of said first photocurrent; and the second delay demodulator comprises a second delay line responsive to the second photocurrent to form a second delayed photocurrent ($i_h(t-T)$) and a second multiplier responsive to both said second photocurrent and said second delayed photocurrent, the product being the squared representation of said second photocurrent.

5. A coherent lightwave demodulator as defined in claim 1 wherein the received lightwave signal is a DPSK modulated signal of the form $E_R(t) = M(t)\sqrt{2P_R} \cos[\omega_R t + \theta_R(t)]$ and the locally generated lightwave oscillating signal is of the form $E_L(t) = \sqrt{2P_L} \cos[\omega_L t + \theta_L(t)]$.

* * * * *